Jan. 7, 1969   B. S. CHAMBERLAIN ET AL   3,420,993
REDUNDANT ANALOG FAILURE CORRECTION AND DETECTION
PROCESS AND APPARATUS
Filed Nov. 23, 1964                              Sheet 1 of 4

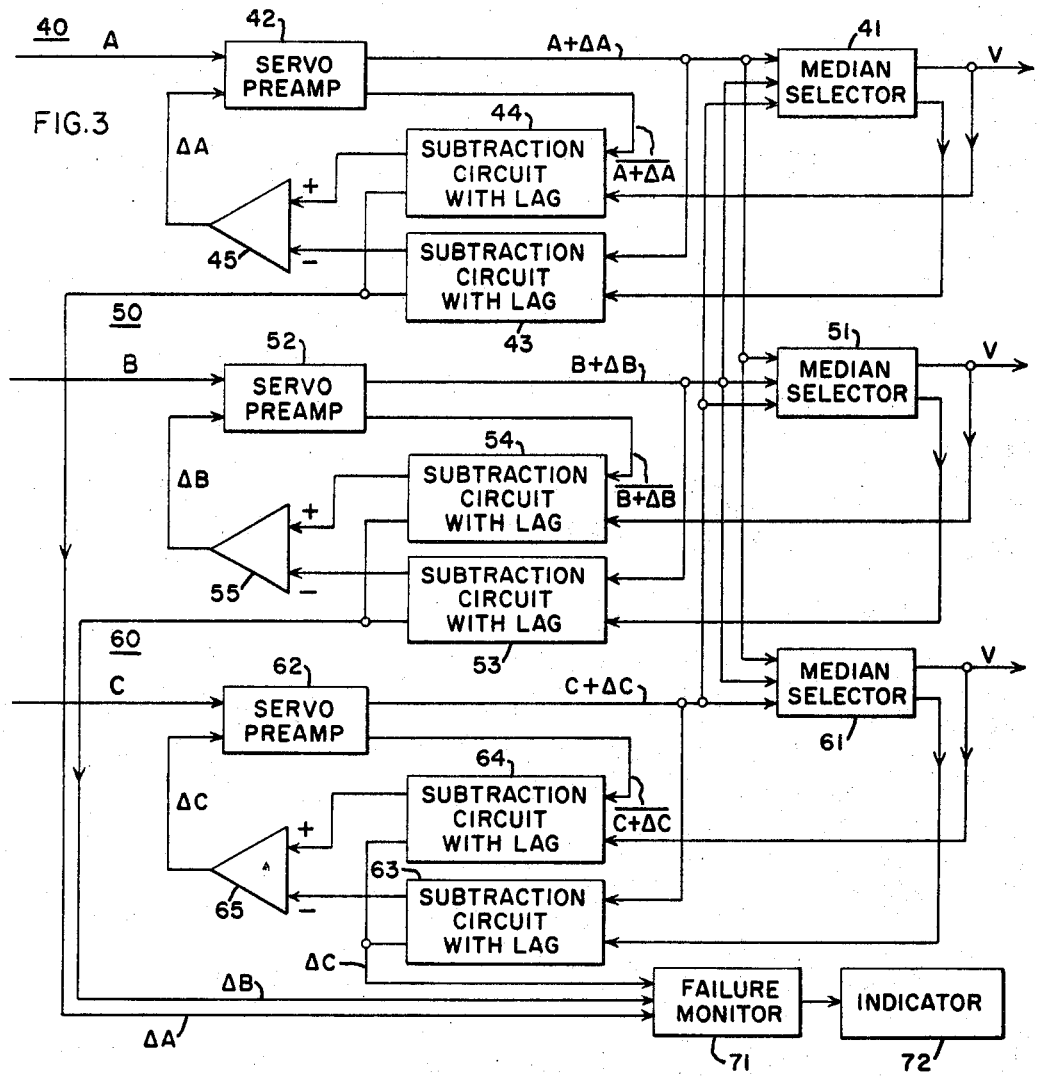

United States Patent Office 3,420,993
Patented Jan. 7, 1969

3,420,993
REDUNDANT ANALOG FAILURE CORRECTION AND DETECTION PROCESS AND APPARATUS
Billy S. Chamberlain, Johnson City, Byron J. Shinn, Vestal, and Luther D. Sunderland, Apalachin, N.Y., assignors to General Electric Company, a corporation of New York
Filed Nov. 23, 1964, Ser. No. 413,271
U.S. Cl. 235—184                                       6 Claims
Int. Cl. G06g 7/02

ABSTRACT OF THE DISCLOSURE

An active filtering process which automatically balances the three branch analog signals (or analog derived signals) of a triply redundant data processing system toward the median signal value, thereby reducing the output signal jump which would otherwise occur when the median signal fails and a new median signal is selected by the triply redundant system. Furthermore, this balancing process is designed to provide a slow transition to the unbalanced value of this new median signal, while at the same time rapidly balancing the non-median signals. Another feature of this process, which is essential for good response in feedback and automatic control, is that the basic control signal is not filtered (bandpass limited) by the balancing process, only the difference or offset between the non-median and median signals is effectively filtered or smoothed to provide the desired gradual transition from the previous to the new median values.

Some representative analog and pulse width mechanizations of this balancing process are illustrated together with an out-of-limit or failure detection circuit which is readily incorporated in the balancing process.

This invention is directed to process and apparatus for failure correction of redundant analog signals, normally having three parallel sources of signals in an analog data processing system, which permits the selection or voting of a proper output signal. It is primarily directed to the transient problems present in reduntant real-time analog control systems and it has as one advantageous feature, the generation of information signals representing a failure correction operation.

Digital data processing systems and digital computers which utilize triply redundant circuits generally rely on the characteristic that each purely digital signal is either correct or incorrect. If a signal failure occurs with triple redundancy, two signals remain which are identical, and it is only necessary to "vote" to determine which signal has failed and then select the appropriate signal, that is, the signal for which two input signals are identically equal to the correct signal. On the other hand, analog signals are never perfectly identical. In a triply redundant analog system or a digital system based on data derived from an analog system or from an analog sensor the median signal is selected for propagation as the "correct" signal. Because of the digital analogy, this selection process is often called "voting." If the source of the median valued signal fails, as illustrated in FIGURE 1A, by a step change due to a short or a broken wire, etc., there is an inherent transient jump effect, which is not present in a purely digital system. With such a failure, a 50% step change in the output signal is not extraordinary. In many applications, such as aircraft flight control systems, a large step change can not be tolerated and can well have catastrophic results.

Another example of redundancy problems in control systems is where a failure results in one signal having an oscillatory form as illustrated in FIGURE 1B. If the oscillation in part of its excursions is a median value, the output will be correspondingly oscillatory, with amplitude limits provided by the remaining two input signals. Because the system may respond regeneratively to this oscillation, such oscillations must be avoided. While these types of problems can sometimes be controlled by limiting the rate at which the output signal varies, control systems generally cannot tolerate the resulting limit on their speed of system response. Introducing lags in a command signal sufficient to avoid step changes usually causes intolerable sluggishness for the system.

In failure correction systems it is usually important to identify failures in addition to correcting them. This is due to the fact that in the process of correcting the failure the system has to "use up" some of its basic redundancy. Thus, the resulting system has a reduced equivalent mean time to failure. For example, consider a triply redundant system with failure in a specific block (the span of computation protected by voters). It is necessary that neither of the other two signals fail in the manner of the first failure or the total system will experience a failure. The pilot or system operator needs to be appraised of this situation when it occurs so that appropriate action (e.g., manual operation) can be taken. Thus, a failure indication is needed to warn of reduced system reliability. Since failures might be of an intermittent nature it is often desirable to store, in an irreversible manner, information representing the fact that a failure has occurred. This permits the operator to time share his efforts between monitoring the warning indicator and other system tasks. Thus, it is not necessary to devote complete attention to the warning indicator to detect any transient failures. In digital systems, the identification of failures is relatively simple, requiring only the sensing of one signal being different from the two remaining signals. With analog signals or with digital signals representing analog derived information, it is much more difficult because of the absence of a comparable standard. Furthermore, the failure identification normally includes the function of storing the failure occurrence information in an irreversible manner. Normally, a warning light or some other indicator is turned on for a failure and kept on. In the operation of analog systems, spurious failures frequently occur which are effectively self-correcting but may incidentally cause a failure correction operation. It is usually desirable to have the failure detection operation discriminate such spurious failures and reject them for failure detection storage and indication.

Accordingly, it is an object of the invention to provide a modified median selection process for analog redundant systems, i.e. either purely analog systems or systems processing analog information by digital processes, which obviates large transient changes in the output signal due to failure of an input median signal, without introducing intolerable response lags.

Another object of the invention is to provide a redundant analog failure correction apparatus which provides an indication of failure correction operation that is not spurious.

Briefly stated, in accordance with certain aspects of the invention, a process of median selection or voting of redundant analog information signals has been discovered which permits substantial correction for errors without large transients where the source of the median valued signal fails. For three redundant input signals, three signal balancing channels are provided. As before without balancing, the final output is the median of the three redundant signals, but these signals are the original redundant signals modified by the addition of balancing signals. The balancing signals are provided by slaving each input signal, for conventional median selection, to the median selection output. The balancing signal errors in respect to the median output, are processed by introducing gain and lag in the difference signals and adding the result to the respective original input signals. With this arrangement, the two non-median original signals, with the balancing signals added, become modified signals which closely bracket the median signal. In the event of a median signal failure, the two bracketing, balanced-redundant signals prevent the final output signal from changing too rapidly. On the other hand, when the median signal changes rapidly, but correctly, the balanced redundance signals change proportionately rapidly so that these bracketing signals produce little or no restraint on system response time.

The invention, together with further objects and advantages thereof, may best be understood by referring to the following description taken in conjunction with the appended drawings in which like numerals indicate like parts and in which:

FIGURE 3 is a block diagram of a preferred electronic embodiment of the invention utilizing triply redundant pulse-width signals.

Figure 2:
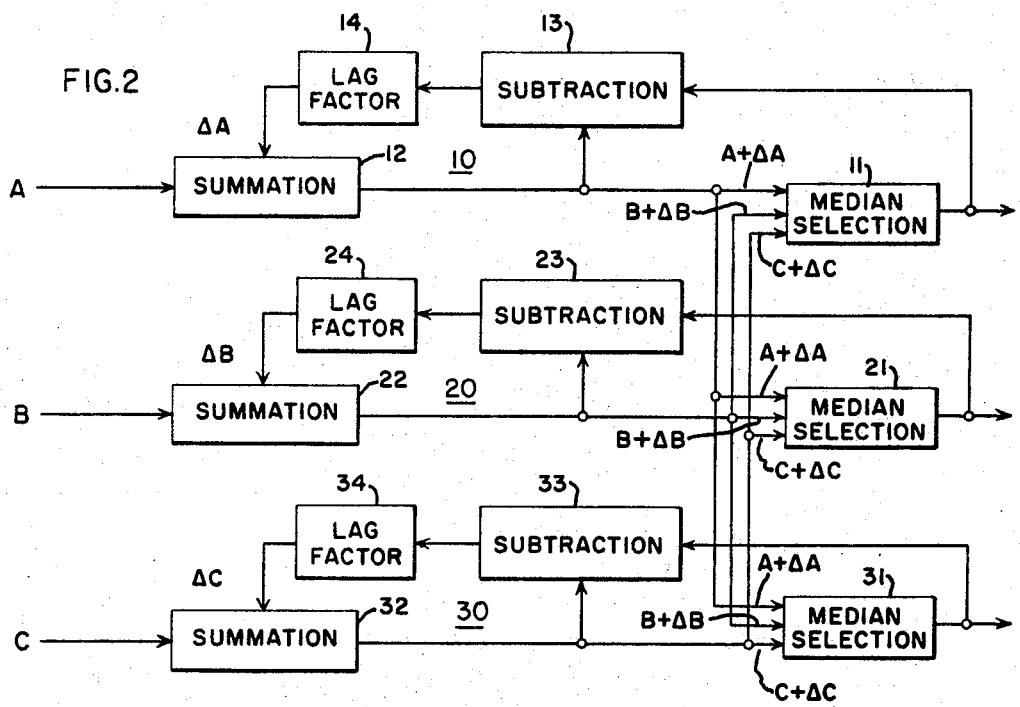
FIGURE 2 is a block diagram illustrating the novel failure correction process.

Referring now to the drawings, FIGURE 2 is a generalized illustration of the required process operations for the improved redundant analog median selection. Three redundant voting or median selection operations are performed, as represented by blocks 11, 21 and 31, in the same manner as previously. In the absence of a failure in these median selection operations per se, the outputs of each are identical. The input sets to each block 11, 21 and 31 are also identical and the purpose of redundant median selection is to insure against a failure in the median selection operation as opposed to the object of detecting and rejecting an error due to a failure in the sources of the original redundant signals A, B, and C. Where redundant voting is not desired, such as where the probability of failure of two of the signals A, B, and C is very much greater than a single median selection failure, it may be preferable to perform only a single median selection operation and use the final common median output in each of the balancing channels. In practising the invention, it is essential for each redundant input signal A, B, and C to be processed by a respective balancing channel 10, 20 and 30 in which the signals are modified by a summation operation 12, 22, and 32 that adds algebraically a balancing signal $\Delta A$, $\Delta B$, $\Delta C$. The balancing signals are generated by a subtraction operation 13, 23, 33 for each redundant signal A, B, C from the median output followed by an operation introducing lag 14, 24 and 34 in the resulting difference signal. The resulting signals, after being summed with the original redundant signals, are balanced redundant signals. One of the input signals, B for example, is the median and substantially identical with the output signals while the remaining signals are bracketed about the median. For example, under steady state conditions if A is low, $A+\Delta A$ is close to B in value but slightly less, and $C+\Delta C$ is similarly slightly greater than B. Because the output is equal to B, $\Delta B$ is equal to zero and the median signal is unaffected by the balancing channel as long as B is constant. However, a failure caused change in B, which in prior art median selection would be directly reflected in the final output, is closely limited by $A+\Delta A$ and $C+\Delta C$. If B drops below the balanced redundant signal $A+\Delta A$, the latter takes over as the median signal and therefore initially keeps the output signal near the value that B would have had if it would not have failed. Similarly, the $C+\Delta C$ signal takes over as the median signal if the failure has caused B to increase. However, if the failure continues, $\Delta A$ (or $\Delta C$) gradually goes zero, as permitted by the lag operation 14 (or 34) until the output reflects A (or C) in the same manner as it did for signal B before the failure. Where there has been no failure, but the B signal has changed rapidly in a proper fashion, the output change will not be significantly inhibited. Although $\Delta A$ and $\Delta C$ will provide a close bracket on the median output, both A and C will vary with B so that the bracket formed by $A+\Delta A$ and $C+\Delta C$ moves with B without significant lag.

Figure 1A:
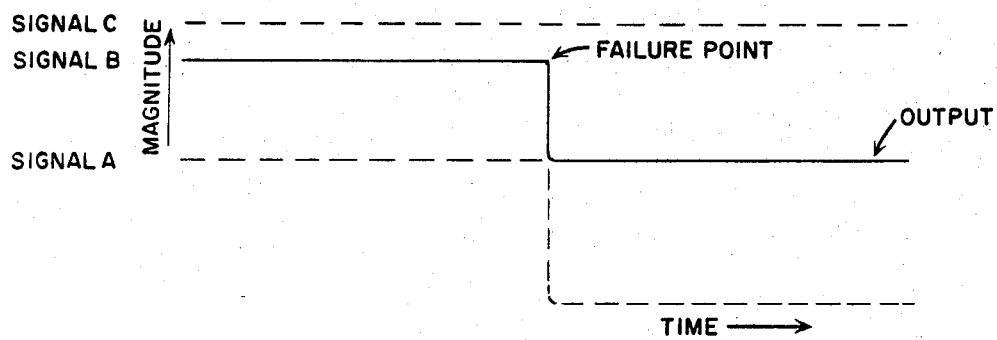
FIGURES 1A and 1B illustrate examples of undesirable failure correction operations in a redundant analog system.
Figure 1B:
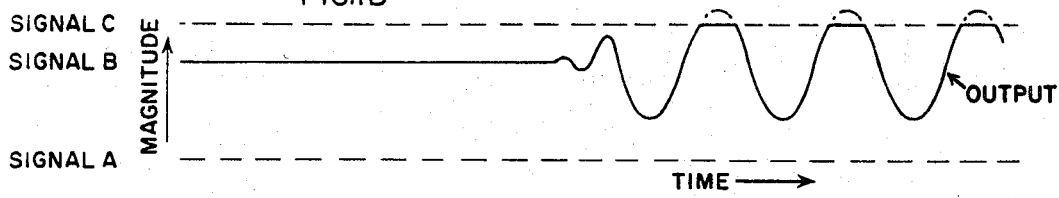

As shown in FIGURE 1, the process is applied to a triply redundant system, which is the preferred application. With three inputs, the majority of inputs provides a sound source of information for detecting failures and the median selection operation can be provided for general application as opposed to a failure correction method which relies on special behavior characteristics in a particular application for failure detection and relies on failure lock-out together with input averaging for correction, for example. However, it should be apparent to those skilled in the art that the process is applicable to other systems such as median selection of five input signals or some dual input systems using pseudo-median selection. Similarily, it should be apparent to those skilled in the art that the process is not limited in use to systems that use analog computation solely but is also applicable, for example, to systems using digital technique in the treatment of data derived from analog sources.

A preferred embodiment implementing the invention is shown in block diagram form in FIGURE 3 which utilizes pulse-width modulated signals. Redundant input signals A, B, and C are positive going voltage signals which recur at a fixed system repetition rate and have a duty cycle departing from 50% which is proportional to the positive or negative value of the variable being represented. Summation of the original redundant signals with the balancing signals $\Delta A$, $\Delta B$, and $\Delta C$ is performed by respective conventional servo preamplifiers 42, 52, and 62. In most design situations, median selection is performed before or after a system functional block which adds and/or amplifies a control signal. This permits, as with the present embodiment, the use of a servo preamplifier, etc., which already is present for other functions and can perform the extra function of adding the balancing signals $\Delta A$, etc., to the respective input signals, A, etc. A conventional median selector 41, 51, 61 is provided for each balancing channel 40, 50, 60. Each median selector, in response to the same set of balanced-redundant signals, $A+\Delta A$, $B+\Delta B$, and $C+\Delta C$, generates an output pulse-width signal, a positive voltage lasting as long as any two of the input pulses persist. In a sense, the selector performs a digital-like vote to determine the presence of input pulses. It provides an output pulse having a duration equal to the pulse-width duration of the median signal. Because of the special polarity considerations with pulse-width signals, each balancing channel has two parallel branches for efficiently processing bi-polarity information signals. The selector 41 output is applied in parallel to each balancing branch. Both normal and complemented outputs are provided. The regular output of servo amplifier 42 is applied to one branch and the complement output $\overline{A+\Delta A}$ is applied to the other branch. In the first branch, the difference between the complement signal of the median selector and $A+\Delta A$ is provided by subtraction circuit 43. This circuit also provides lag so that it is conveniently comprised of simple pulse-width circuitry together with a simple filter which converts the difference signals to a D-C signal proportional to the duty cycle and typically having a one second time constant. Similarly, subtraction circuit 44 operates upon the normal median output and a complement signal $\overline{A+\Delta A}$ which is an auxiliary output of preamplifier 42.

The actual polarity of the voltage output of all summation circuits is positive. A summing amplifier 45 is used to invert the negative branch signals and combine them with the positive branch signals. Thus, the output of the summing amplifier 45 is a single wire, dual polarity balancing signal which is fed to the servo preamplifier 42, etc. Since the outputs of all subtraction circuits are positive voltages, they are fed through isolation diodes 79 to a common failure detection circuit or monitor 71. Since the signals for the selector monitor are all positive voltages, they have in effect been derived by a full wave rectifier process from the feedback balancing signal. Thus, only a single polarity threshold is required. The use of diodes 79 results in a logical "OR" operation for all input signals, that is, only the most positive signal controls the action of the selector monitor 71 and indicator 72.

Figure 4:
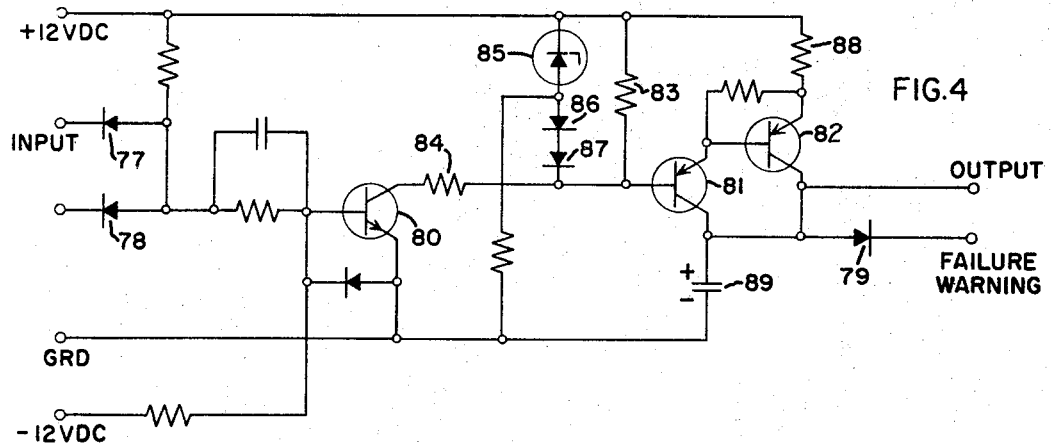
FIGURES 4–6 are schematic diagrams of suitable components for the FIGURE 3 embodiment, namely a subtraction circuit, a balancing circuit and a monitor circuit, respectively.

FIGURE 4 is a schematic diagram of a suitable subtraction circuit having lag for circuits 43, 44, 53, 54, 63, and 64 of FIGURE 3. This circuit is designed to take the algebraic difference between the width of the two pulse-width signals and convert this to a proportional output signal. The smaller of the two signals must be of inverted form. Both signals must be positive for the "ON" portion of the pulse-width signal. The normal pulse-width signal and the inverted pulse-width signal are coupled into the first stage by means of diodes 77 and 78. This first stage is essentially a digital NOR circuit. This is, an output from transistor 80 is produced only when both of the input terminals are positive. It can be seen then that for the positive branch, transistor 80 conducts only when the balanced signal is greater than the voter output, and for the negative branch, transistor 80 conducts only when the voter output is greater than the balanced signal.

The conduction of transistor 80 is used to switch on a current generator comprised of transistors 81 and 82. In its normal state, transistor 81 is held off by the bias resistor 83 which is connected to the positive supply voltage. When transistor 80 conducts, it shorts resistor 84 to ground, and the voltage at the base of transistor 81 will drop to the potential determined by the Zener diode 85 and the coupling diodes 86 and 87. The nominal voltage drop across 85 is 5.6 volts and the resulting voltage at the base of transistor 81 will then be two diode drops lower. These two coupling diodes provide temperature compensation for the base emitter diodes in transistors 81 and 82. These transistors are connected in a modified "Darlington" circuit. When transistor 81 conducts, the voltage of the Zener diode 85 effectively appears across the resistor 88 in the emitter of transistor 82. Since the collectors of transistors 81 and 82 are connected together to the output nearly all of the current through resistor 88 also appears in the output. Thus the resistance 88 and the voltage across the Zener diode 85 determine the gain of this current generator. The resistor 88 is selected to match the voltage of the particular Zener diode used for the desired peak value of the pulse current, which typically will be 4.45 ma. The output of the subtraction circuit is a voltage drop developed by the pulse current across the capacitor 89 and the input impedance of the summing amplifier 45. This combination gives an RC time constant of approximately one second. The capacitor 89 is charged by the pulse error signal which varies from zero to thirty microseconds, depending on input error, and discharges for the remainder of the pulse-width period. The filtering action of the capacitor 89 in effect converts the pulse signal from the current generator transistors 81 and 82 into an average DC voltage which is proportional to the difference of the two input signals.

Capacitor 89 provides the short time memory function desired for the balancing feedback. When a failure occurs in the median branch the voters will select another branch at the median value. The voltage on capacitor 89 will fade away slowly with a one second time constant so that the switchover transients are avoided. Thus capacitor 89 not only effectively converts the error pulses into average DC current but also provides the one second lag filtering in the balancing feedback. Since all gain in the feedback loop effectively precedes this operation, filtering limiting of transient peaks and saturation is avoided.

Figure 5:
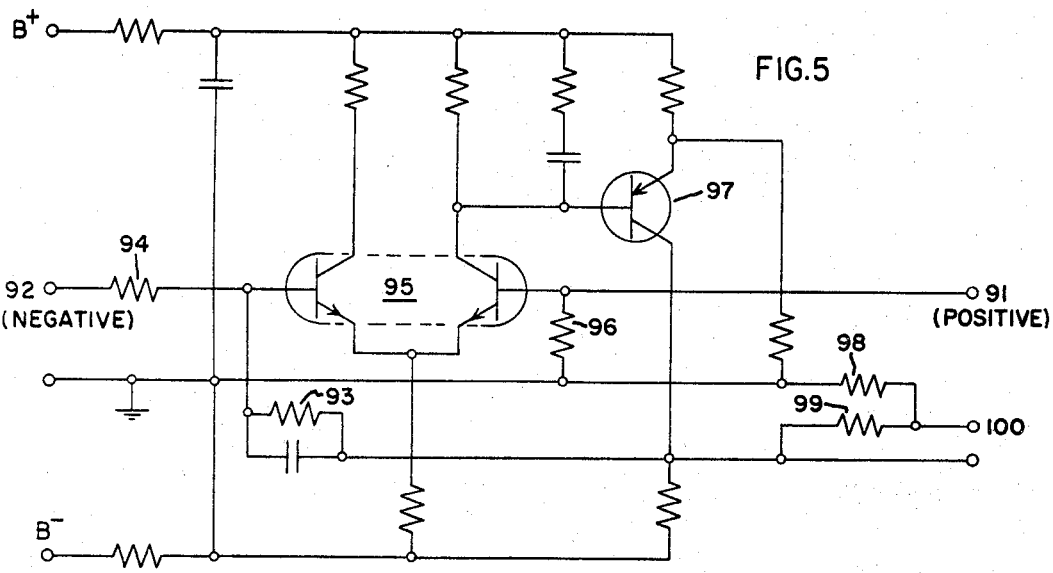

FIGURE 5 shows the schematic diagram of the summing amplifiers 45, 55, 65. Inputs from the positive branch are fed into terminal 91 while inputs from the negative branch are fed into terminal 92. The overall voltage gain from input terminal 92 is minus one and the overall gain from terminal 91 is plus one. The summing amplifier is essentially a high gain unity feedback amplifier with differential inputs. The feedback resistor 93 and input summing resistor 94 are connected to the base of transistor 95. Since this summing point is effectively a low impedance point, the input impedance for terminal 92 is the value of resistor 94. In order to make the input impedance proper for the other input, a loading resistor 96 is connected from the other base of the dual transistor 97 to ground. Since the subtraction circuits are effectively current generators, the signal sources feeding terminal inputs 91 and 92 have effectively infinite output impedance. Thus, for the signal fed into terminal 91, there will be no voltage divider action of the resistors 93 and 94 to attenuate the signal appearing on the first base of the dual resistor 95. Resistor 94 will be effectively floating and the base of transistor 95 will be slaved by the feedback action to the voltage impressed on the base of transistor 97. The only voltage error will be the IR drop of the base current through resistor 93. An attenuator formed by resistors 98 and 99 are inserted to provide attenuation to the output appearing at terminal 100. This scales the signal properly so that a threshold can be used for all circuits in the median selector monitor 71.

Figure 6:
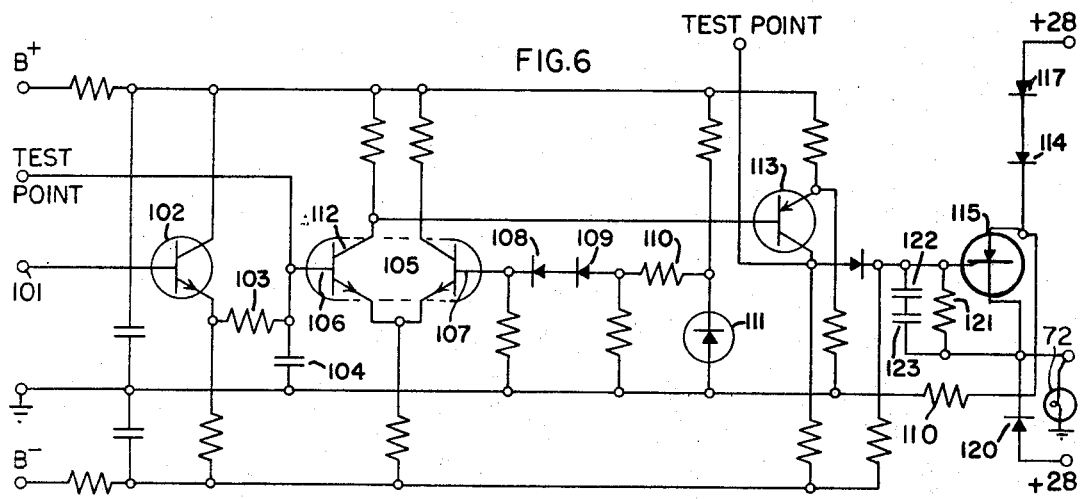

FIGURE 6 is a schematic diagram of a median selector monitor circuit 71. Input terminal 101 is connected to the base of emitter-follower transistor 102. This emitter-follower drives a low-pass filter, comprised of resistor 103 and capacitor 104, which provides about a quarter second time constant filter. The output of this filter is applied to base 106 of a differential transistor 105. Base 107 of this transistor is coupled to a tap on a voltage divider by means of two temperature compensating diodes 108 and 109. Resistor 110 in this voltage divider is selected together with a particular Zener diode 111 so as to provide the desired potential at the anode of diode 109. This is the threshold voltage with which all inputs are compared for failure detection. When any input voltage exceeds this level, collector 112 of transistor 105 conducts, turning on transistor 113 which in turn fires silicon controlled rectifier 115. The resulting output is connected to indicator lamp 72.

This circuit takes advantage of the characteristics of the SCR 115 to provide the desired memory function. Once SCR 115 is fired, it will remain in that condition until reset, since a DC anode voltage is supplied. In order to reset the SCR, the anode-to-cathode voltage must be reduced to zero or even back-biased. An external circuit provides the reset function by tying to the 28 volt bus. This voltage in turn is coupled to the cathode of SCR 115 by means of a coupling diode 120. Since there is a diode in series with a reset signal it is necessary to provide an extra diode drop in series with the SCR 115 anode to assure proper back-biasing. Hence two dropping diodes, 117 and 114, are required. Resistor 110 assures that these anode dropping diodes are always forward biased. With the 28 volt reset signal applied the net voltage drop across the SCR 115 measured from anode to cathode is a negative one diode drop. It should be pointed out that the monitor 71 can not remain reset so long as any input remains above the threshold. Resistor 121 provides the low impedance path between gate and cathode to prevent gate leakage current from inadvertently firing the SCR 115. Capacitors 122 and 123 provide a low impedance path to shunt high frequency noise and prevent accidental firing of the SCR.

Figure 7:
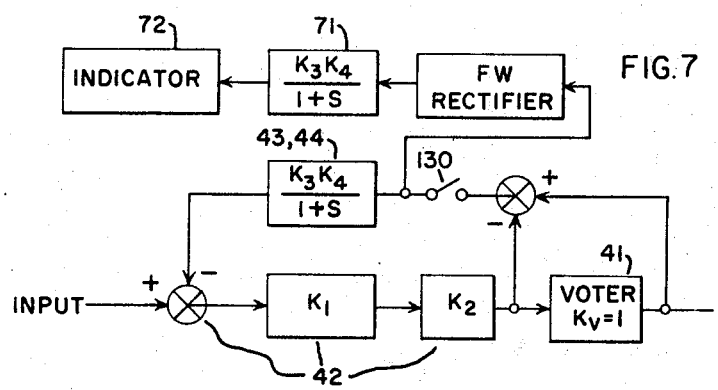
FIGURE 7 is an equivalent transfer function diagram of the circuit.

FIGURE 7 is an equivalent functional block diagram of a FIGURE 3 balancing channel. The response of the balancing circuit is very fast under normal operation if the feedback gain $K_3K_4$ is high (which results in a high loop gain, $K_1K_2K_3K_4$. When $K_1K_2K_3K_4=20$, the standoff error is only $\frac{1}{21}$ of the uncompensated error. For example, an uncompensated error of a non-median channel of 50% full scale would be reduced to about 2½% by the feedback balancing. With this loop gain of 20 and a time constant of one second in the feedback lag network the balancing action is performed at a 21 radian/sec. response.

When the median signal falls to a value such that a different branch becomes the median signal, the voter output will fade slowly to the new median signal at the time constant of the lag network. The reason for the different response under normal and failed operation is that under normal operation when an error exists between a branch output and the median selector output, the feedback loop operates in a closed loop manner, keeping the error signal small. The transfer function for the error portion of the input signal is simply $$\frac{G}{1+GH} = \frac{3.7}{1+\frac{3.7 \times 5.4}{(1+S)}} = \frac{3.7(1+S)}{2(1+S)}$$

where $K_1K_2=3.7$ and $K_3K_4=5.4$.

When a particular branch is also the median signal, the feedback error is zero and the loop is essentially open. This has the same effect as opening switch 130. Any charge existing on the capacitor in the lag network will then bleed off at the time constant of the lag network (one second). When a branch becomes the median signal it will thus fade to its true value very slowly.

When a non-median branch does not track with the median signal, the balancing response is rapid because of the loop gain. In this mode, the required balancing adjustment will be forced proportionately to the departure of the error signal from the small steady state level.

The error between each branch output and the voter output is effectively full wave rectified and then filtered by the lag network to the monitor 71. The indicator 72 is then operated when the D-C level of the inputs to monitor 71 exceed a critical threshold and this threshold can be adjusted to any desired level.

The circuit design actually used for the failure warning function takes advantage of the elements already existing in the balancing feedback circuitry to provide the full wave rectifier action and the filter. The feedback gain $$\frac{K_3K_4}{1+S}$$

is actually composed of two parallel paths, one for positive feedback signals and one for negative feedback signals. The voltages in both paths are of positive polarity. Hence, if these two feedback signals are summed the full wave rectifier action results; if the negative feedback is substracted from the positive feedback the error signal desired for balancing feedback is obtained. An analysis of the system shows that the equivalent filter 71 for the failure warning signal is actually $$\frac{K_3K_4}{1+S}$$

that is, the gain of the feedback path 43, 44. A lag with a one second time constant has been found to be satisfactory for the failure warning function also. It functions as a short time integrator after the full wave rectification. Thus, for oscillatory or steady state errors, the D-C output will slowly rise toward the peak value and eventually trigger the warning indicator. For normal operations, however, the transients will not be large enough or continuous enough to allow the signal to the warning indicator 72 to reach the threshold level.

Figure 8:
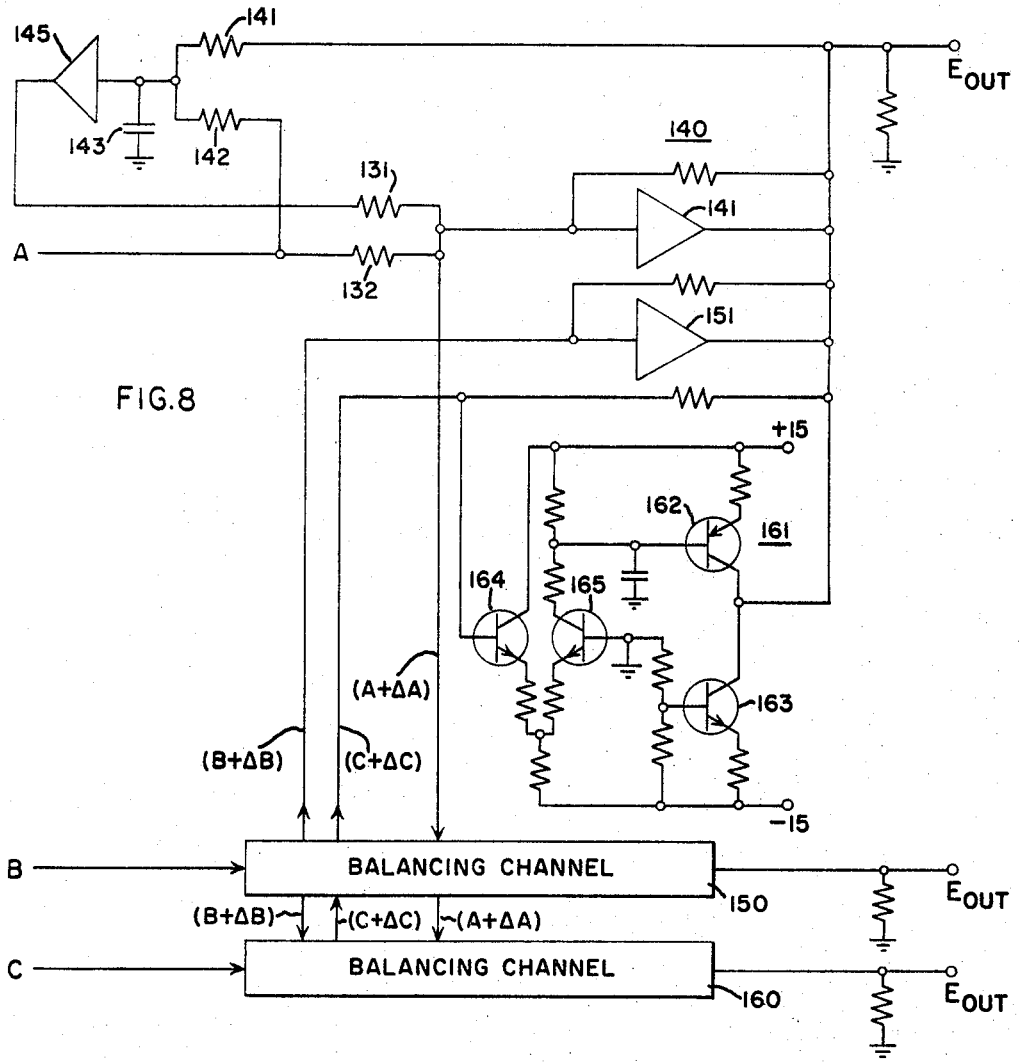
FIGURE 8 is a schematic diagram of a second electronic embodiment of the invention utilizing analog voltage signals.

FIGURE 8 illustrates another embodiment of the invention adapted for redundant analog voltage signals. The three balancing channels 140, 150, and 160 are identical, each channel balancing one of the input signals A, B, or C and supplying the balanced signal $A+\Delta A$, $B+\Delta B$, or $C+\Delta C$ to the other channels. Median selection is performed by three operational amplifiers 141, 151, and 161. The amplifiers are D-C coupled with a current limited output. They are provided with input and feedback resistors which are of equal value to provide unity gain. By providing a common output point for all the amplifiers, the voltage output across a load impedance will be in accordance with the median input signal. Balancing is provided by subtracting the input to be balanced from the median selector output, introducing lag with a storage capacitor 143, for example, and feeding back the amplified signal from amplifier 145 to operational amplifier 141. A suitable operational amplifier is shown in FIGURE 8 for amplifier 161. Transistors 162 and 163 operate as a constant current generator and transistors 164 and 165 operate as a balanced differential input stage for voltage gain.

As is apparent from the above embodiments, this invention is useful generally in rebundant analog data processing, particularly where substantial differences are allowed between parallel data. The invention provides several operating features which are seemingly conflicting. The balacing channels are feedback loops which have, in effect, different operating characteristics for different system conditions. By providing a lag factor and gain in the loop, the balancing of non-median signals is rapid, but the loop is slow when a median signal fails. This is so because the combination of a substantial error signal (the instantaneous median signal minus the instantaneous balanced signal $A+\Delta A$, etc.) and the loop gain results in the lag factor being swamped. (In fact, the gain tends to cause an overshoot, depending upon the filter characteristics and the amount of gain selected.) On the other hand, when a non-median signal becomes a median signal because of a failure in the prior median signal, the error signal for the balancing loop is determined by the balanced signal with itself (the output of the median selector) and a substantial lag results. Also, with the balancing loops arranged as they are, with the non-median signals balanced close to the median signal, but definitely offset, it has been discovered that the resulting set of redundant signals can be kept close enough to make a change-over effectively unnoticeable in respect to system operation while retaining the absolutely essential feature of redundant signals capable of median selection. This makes possible the avoidance of "hard-over" failure correction without sacrificing overall system operating characteristics. The invention is concerned with real-time processing of redundant analog signals generally and is not limited to a particular kind of signal modulation or carrier. In general, balancing in accordance with the invention can be performed with apparatus which is mechanical, electrical, electronic, etc., as long as it is subject to standard servomechanism analysis. Furthermore, balancing in accordance with the invention causes the generation of signals that are ideally suited for monitoring failure correction operations.

While particular embodiments of the invention have been shown and described herein, it is not intended that the invention be limited to such disclosure, but that changes and modifications can be made and incorporated within the scope of the claims.

What is claimed is:
1. A balanced redundant median selector comprising:
   (a) a median selection device, being responsive to a plurality of balanced redundant input signals;
   (b) a plurality of balancing devices, each device being responsive to one of said redundant input signals and said median selector device output signals for providing a lagging balancing signal with gain, for each of said redundant input signals, to said median selector.

2. A balanced triply redundant median selector comprising:
   (a) median selector means for providing an output signal in accordance with the median of three input redundant signals;
   (b) three summation means for providing respective input signals for said median selector means in accordance with the sum of a balancing signal and an unbalanced redundant input signal;
   (c) three balancing means for providing said balancing signals, each balancing means being responsive to the difference between a median selector means output signal and a respective summation means output to generate an amplified lagging balancing signal.

3. A balanced median selector for redundant analog signals comprising:
   (a) a median selection device for generating an output signal in accordance with the median of a plurality of redundant balanced input signals.
   (b) a plurality of balancing summation devices for providing balanced input signals for said voter device, a summation device being provided for each analog input signal;
   (c) a corresponding plurality of balancing devices, each balancing device being responsive, with lag, to the median output signal and a balancing summation device output signal for providing a second input to the balancing summation device whereby the median selection device input signals are normally unaffected by said balancing devices but a failure in one unbalanced input signal results in an attenuated transient.

4. The median selector of claim 3, further comprising:
   (d) a monitor, responsive to said balancing devices, for indicating and storing a failure correction operation.

5. A network for processing triply redundant pulse-width modulated signals for median selection comprising:
   (a) three balancing channels, responsive to the respective redundant input signals and a median signal, for providing respective balancing signals;
   (b) each balancing channel including a positive branch, responsive with lag to the difference between the median signal and a balanced input signal, and a negative branch responsive with lag to the difference between the median signal and the complement of the balanced input signal;
   (c) each balancing channel having a summing amplifier which is responsive to both positive and negative branches for providing the desired balancing signal;
   (d) three median selectors, each responsive to all three balanced input signals, for providing redundant output median signals;
   (e) a monitor, responsive with lag to each of said balancing channels, for producing a failure indication when a balancing signal exceeds a selected threshold level for a time beyond a selected transient period.

6. Apparatus for utilizing three redundant information signals derived from analog data so as to provide selection of a median valued signal in such a manner that the output signal changes slowly when a median failure occurs but the output changes rapidly when the input signals change without failure, comprising:
   (a) summation devices for summing each of the three redundant input signals with a corresponding balancing signal to produce three summed signals;
   (b) means responsive to the outputs of said devices for selecting the median signal of the three summed signals;
   (c) electronic subtraction means, responsive to the outputs of said devices and of said means for selecting, for deriving balancing correction signals proportional to the difference between said median signals and each of the summed signals;
   (d) electronic filter means responsive to said balancing correction signals for producing balancing signals by introducing lag and gain in the balancing correction signals so that the summed signals are balanced.

References Cited

UNITED STATES PATENTS

| 3,206,679 | 9/1965 | Miller | 325—304 |
| 3,243,585 | 3/1966 | Escobosa | 235—184 |
| 3,363,111 | 1/1968 | Moreines | 307—235 |

MALCOLM A. MORRISON, *Primary Examiner.*

C. E. ATKINSON, *Assistant Examiner.*

U.S. Cl. X.R.

340—172; 328—147, 173